US008154158B2

(12) United States Patent
Saban et al.

(10) Patent No.: US 8,154,158 B2
(45) Date of Patent: Apr. 10, 2012

(54) COOLING AN ELECTRICAL MACHINE

(75) Inventors: Daniel M. Saban, Corona, CA (US); Cassandra Bailey, Anaheim, CA (US); Paulo Guedes-Pinto, Brea, CA (US)

(73) Assignee: Direct Drive Systems, Inc., Fullerton, CA (US)

( * ) Notice: Subject to any disclaimer, the term of this patent is extended or adjusted under 35 U.S.C. 154(b) by 403 days.

(21) Appl. No.: 12/049,117

(22) Filed: Mar. 14, 2008

(65) Prior Publication Data

US 2008/0224551 A1 Sep. 18, 2008

Related U.S. Application Data

(60) Provisional application No. 60/895,025, filed on Mar. 15, 2007.

(51) Int. Cl.
*H02K 9/19* (2006.01)

(52) U.S. Cl. .......................................... 310/54; 310/64

(58) Field of Classification Search ................ 310/54, 310/52, 58, 64
See application file for complete search history.

(56) References Cited

U.S. PATENT DOCUMENTS

| 1,269,537 | A | * | 6/1918 | Holcombe ................ 310/63 |
|---|---|---|---|---|
| 2,742,582 | A | | 4/1956 | Bahn |
| 2,920,218 | A | | 1/1960 | Beckwith |
| 3,060,335 | A | | 10/1962 | Greenwald |
| 3,439,201 | A | | 4/1969 | Levy et al. |
| 3,439,202 | A | | 4/1969 | Wanke |
| 3,751,699 | A | | 8/1973 | Gleichman |
| 3,809,934 | A | | 5/1974 | Baer |
| 4,348,604 | A | | 9/1982 | Thode |
| 4,362,020 | A | | 12/1982 | Meacher et al. |
| 4,443,723 | A | | 4/1984 | Ohkubo |

(Continued)

FOREIGN PATENT DOCUMENTS

JP 63129839 6/1988

(Continued)

OTHER PUBLICATIONS

Notification of Transmittal of the International Search Report and the Written Opinion of the International Searching Authority, or the Declaration (2 pages), International Search Report (4 pages) and Written Opinion of the International Searching Authority (6 pages), International Application No. PCT/US2008/057082, mailed Jul. 8, 2008.

(Continued)

*Primary Examiner* — Quyen Leung
*Assistant Examiner* — Naishadh Desai
(74) *Attorney, Agent, or Firm* — Fish & Richardson P.C.

(57) ABSTRACT

An electrical machine includes a stator and a rotor disposed in a housing of the electrical machine. The stator includes windings having a first set of end turns at a first end of the stator and having a second set of end turns at a second, opposing end of the stator. The stator has a substantially tubular shape and an interior lateral surface. The rotor extends through the interior of the stator. A flow inlet into a volume in the housing about the first end turns is located radially outside of the interior lateral surface of the stator. A flow outlet from the volume in the housing about the first end turns is located radially outside of the interior lateral surface. The inlet and the outlet are cooperatively arranged to communicate a flow of fluid substantially transverse across the first end of the stator.

15 Claims, 5 Drawing Sheets

U.S. PATENT DOCUMENTS

| | | | |
|---|---|---|---|
| 4,544,855 A * | 10/1985 | Prenner et al. | 310/59 |
| 4,740,711 A | 4/1988 | Sato et al. | |
| 5,640,064 A | 6/1997 | Boyd, Jr. et al. | |
| 5,668,429 A | 9/1997 | Boyd, Jr. et al. | |
| 5,672,047 A | 9/1997 | Birkholz | |
| 5,682,074 A * | 10/1997 | Di Pietro et al. | 310/215 |
| 5,852,338 A | 12/1998 | Boyd, Jr. et al. | |
| 5,894,182 A | 4/1999 | Saban et al. | |
| 5,911,453 A | 6/1999 | Boyd, Jr. et al. | |
| 5,929,543 A * | 7/1999 | Zeyen et al. | 310/54 |
| 5,990,588 A | 11/1999 | Kliman et al. | |
| 5,994,804 A | 11/1999 | Grennan et al. | |
| 6,002,191 A | 12/1999 | Saban | |
| 6,018,207 A | 1/2000 | Saban et al. | |
| 6,088,905 A | 7/2000 | Boyd, Jr. et al. | |
| 6,191,511 B1 | 2/2001 | Zysset | |
| 6,223,417 B1 | 5/2001 | Saban et al. | |
| 6,270,309 B1 | 8/2001 | Ghetzler et al. | |
| 6,324,494 B1 | 11/2001 | Saban | |
| 6,388,356 B1 | 5/2002 | Saban | |
| 6,437,468 B2 | 8/2002 | Stahl et al. | |
| 6,504,337 B1 | 1/2003 | Saban et al. | |
| 6,777,847 B1 | 8/2004 | Saban et al. | |
| 6,934,666 B2 | 8/2005 | Saban et al. | |
| 6,967,461 B1 | 11/2005 | Markunas et al. | |
| 7,009,317 B2 * | 3/2006 | Cronin et al. | 310/54 |
| 7,025,577 B2 * | 4/2006 | Ioi et al. | 417/371 |
| 7,075,399 B2 | 7/2006 | Saban et al. | |
| 7,208,854 B1 | 4/2007 | Saban et al. | |
| 2003/0074165 A1 | 4/2003 | Saban et al. | |
| 2004/0027011 A1 | 2/2004 | Bostwick et al. | |
| 2004/0109771 A1 * | 6/2004 | Ioi et al. | 417/410.5 |
| 2004/0189429 A1 | 9/2004 | Saban et al. | |
| 2007/0018516 A1 | 1/2007 | Pal et al. | |
| 2007/0056285 A1 | 3/2007 | Brewington | |
| 2007/0063594 A1 | 3/2007 | Huynh | |
| 2008/0103632 A1 | 5/2008 | Saban et al. | |
| 2008/0246373 A1 | 10/2008 | Filatov | |
| 2008/0252077 A1 | 10/2008 | Myers | |

FOREIGN PATENT DOCUMENTS

| | | |
|---|---|---|
| JP | 63277443 | 11/1988 |
| JP | 2001078390 | 3/2001 |
| WO | WO 03/100946 A1 | 12/2003 |

OTHER PUBLICATIONS

International Preliminary Report on Patentability issued in International Application No. PCT/US2008/057082; Mar. 16, 2009; 11 pages.

Freepower FP6,. "Freepower FP6 Specification & Dimensions for 6kWe Electricity Generating Equipment," (2 pages), 2000-2004, printed Jul. 26, 2006.

Honeywell, "Genetron®245fa Applications Development Guide," (15 pages), 2000.

Cassandra Bailey et al., "Design of High-Speed, Direct-Connected, Permanent-Magnet Motors and Generators for the Petrochemical Industry" IEEE, 2007 (5 pages).

Cassandra Bailey et al., "Design and Experimental Evaluation of a High-Speed, Directly-Coupled, Multi-Megawatt Permanent-Magnet Machine" (36 pages) 2007.

Cassandra Bailey et al., "Design of High-Speed Direct-Connected Permanent-Magnet Motors and Generators for the Petrochemical Industry" IEEE Transactions on Industry Applications, vol. 45, No. 3, May/Jun. 2009, pp. 1159-1165; presented at the 2007 IEEE Petroleum and Chemical Industry Technical Conference, Calgary, AB, Canada, Sep. 17-19, 2007.

\* cited by examiner

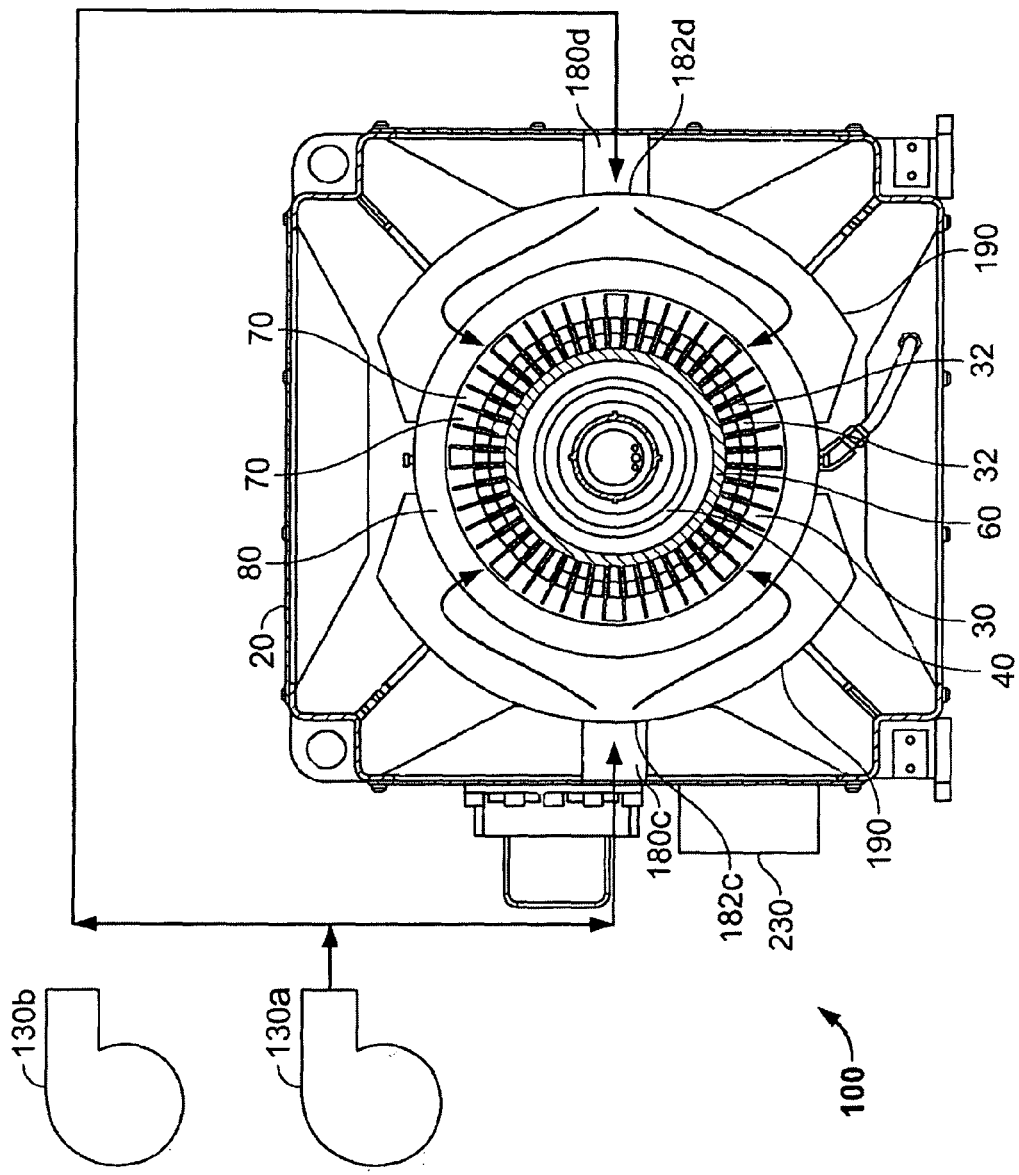

COOLING AN ELECTRICAL MACHINE

CROSS-REFERENCE TO RELATED APPLICATIONS

This application is related to and claims the benefit of U.S. Provisional Patent Application 60/895,025 entitled "High-Speed, Sleeved Rotor for Permanent Magnet Electric Machine" by Saban, et al., filed Mar. 15, 2007, which is incorporated herein by reference.

BACKGROUND

This description relates to motoring and/or generating systems.

Some power systems may convert mechanical energy into electrical energy and/or convert electrical energy into mechanical energy. For example, generating systems can include a prime mover and an electrical machine that generates electricity by converting mechanical energy into electricity. Similarly, motoring systems can include a mechanical load coupled to an electric machine that can convert electricity into movement. In some systems, the electric machine can be operated to generate electricity and convert electricity into movement. Converting energy between the mechanical and electrical domain generates heat, as does movement of the mechanical components of the electric machine.

SUMMARY

An electrical machine includes a stator. Cooling fluid is communicated through a volume external to the stator substantially transverse across one or both ends of the stator, and/or cooling fluid is communicated through a volume internal to the stator in an axial direction toward one or both ends of the stator.

In certain aspects, an electrical machine includes a stator and a rotor disposed in a housing of the electrical machine. The stator includes windings having a first set of end turns at a first end of the stator and having a second set of end turns at a second, opposing end of the stator. The stator has a substantially tubular shape and an interior lateral surface. The rotor extends through the interior of the stator. A flow inlet into a volume in the housing about the first end turns is located radially outside of the interior lateral surface of the stator. A flow outlet from the volume in the housing about the first end turns is located radially outside of the interior lateral surface. The inlet and the outlet are cooperatively arranged to communicate a flow of fluid substantially transverse across the first end of the stator.

In certain aspects, an electrical machine includes a substantially cylindrical stator and a rotor disposed in a housing of the electrical machine. The stator includes windings having a first set of end turns at a first end of the stator and second set of end turns at a second, opposing end of the stator. The rotor extends longitudinally through an interior of the stator. Multiple first inlets are located at locations distributed azimuthally around an exterior of the stator. The first inlets direct flow through a gap axially dividing a core of the stator to an air gap defined between the stator and the rotor. The air gap extends through the interior of the stator from a volume in the housing external to the stator about the first end turns to a volume in the housing external to the stator about the second end turns.

In certain aspects, in a housing of an electrical machine, cooling fluid is received into a volume about a first end of a stator disposed within the housing. The stator includes windings having a first set of end turns at the first end of the stator and a second set of end turns at a second, opposing end of the stator. The stator has a substantially tubular shape and an interior lateral surface, and the flow is received into the volume from radially outside of the interior lateral surface. The flow of cooling fluid is communicated substantially transverse across the first end of the stator. The cooling fluid is collected from the volume from radially outside of the interior lateral surface.

Implementations can include one or more of the following features. The flow outlet can be a first flow outlet, the flow inlet can be a first flow inlet, the volume can be a first volume, and the flow can be a first flow. The electrical machine can include a second flow inlet into a second volume about the second end turns. The second flow inlet can be located radially outside of the interior lateral surface. The electrical machine can include a second flow outlet from the second volume. The second flow outlet can be located radially outside of the interior lateral surface. The second inlet and the second outlet can be cooperatively arranged to communicate the second flow substantially transverse across the second end of the stator. The first flow inlet and the second flow inlet can be in fluid communication with a single source of cooling fluid. A partition in the housing can define the volume about the first end turns, and the flow outlet can be implemented as one or more ports through the partition. The electrical machine can include a second flow inlet directing a second flow through a manifold axially dividing a core of the stator to an air gap defined between the interior lateral surface of the stator and an exterior lateral surface of the rotor. The second flow inlet can be multiple flow inlets at different azimuthal locations around the stator. The first flow inlet and the second flow inlet can be in fluid communication with a single source of cooling fluid. The first flow inlet can be in fluid communication with a first cooling source, and the second flow inlet can be in fluid communication with a second cooling source. The second flow inlet can direct flow to an axial center of the air gap. The air gap can extend in an axial direction to the volume about the first end turns. One or more cooling jackets around an exterior of the stator can circulate liquid cooling fluid circumferentially around the stator to cool the stator. The one or more liquid cooling jackets can define a plurality of serpentine flow paths, where each serpentine flow path circulates the liquid cooling fluid around a different axial section of the stator to cool the axial section of the stator. The liquid cooling jacket can be separable from the housing and separable from the stator. The first inlet and the first outlet can be cooperatively arranged to displace cooling fluid across an outer diameter of the first end of the stator while the fluid is in the volume external to the stator about the first end turns.

The details of one or more implementations are set forth in the accompanying drawings and the description below. Other features will be apparent from the description and drawings, and from the claims.

DESCRIPTION OF DRAWINGS

FIG. 1B is a cross-sectional view taken along line A-A in FIG. 1A.

DETAILED DESCRIPTION

Figure 1A:
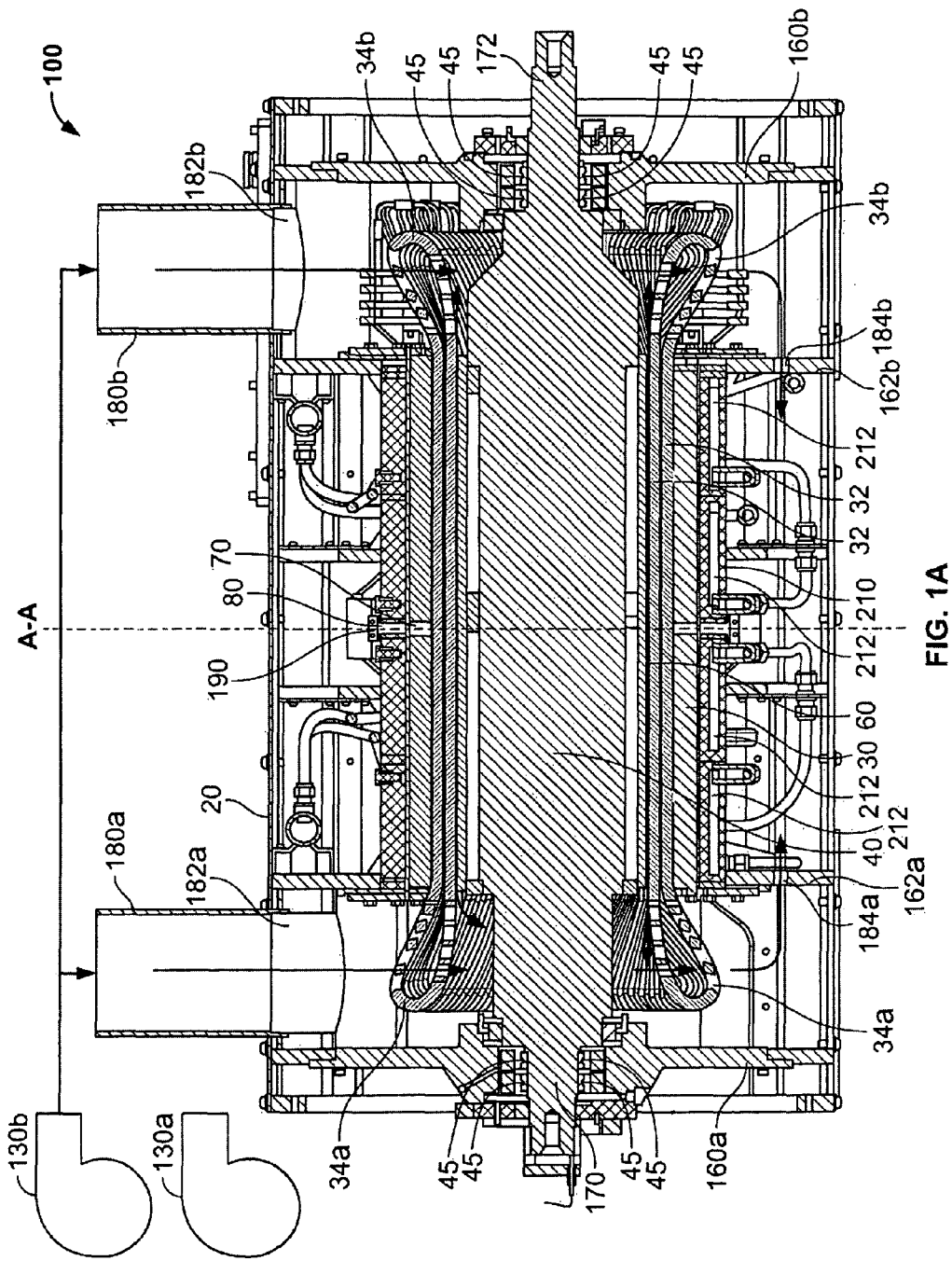
FIG. 1A is a cross-sectional view of an example electrical machine and cooling system.
Figure 2A:
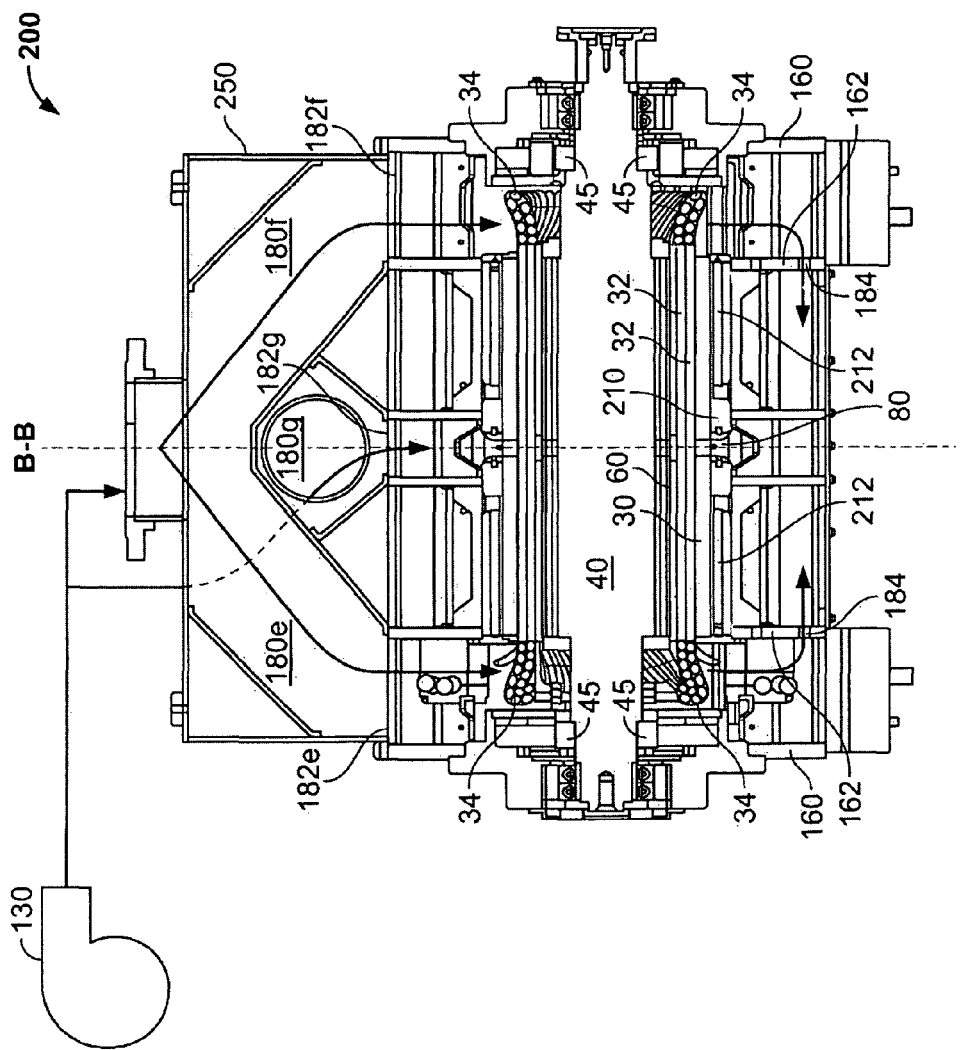
FIG. 2A is a cross-sectional view of an example electrical machine and cooling system.
Figure 2B:
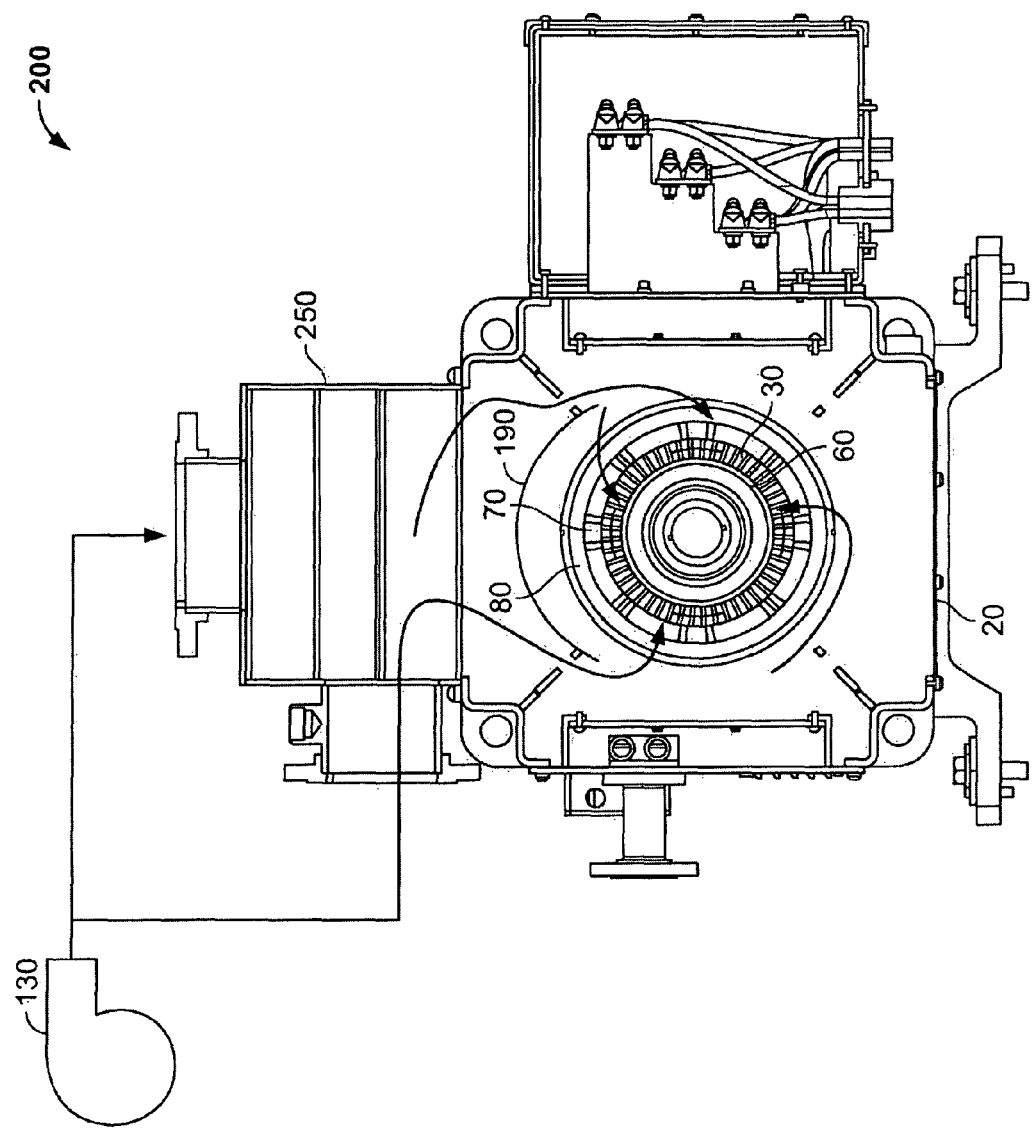
FIG. 2B is a cross-sectional view taken along line B-B in FIG. 2A.

FIGS. 1 and 2 illustrate two example embodiments of an electrical machine that includes a cooling system. FIG. 1A is a cross-sectional view of an example electrical machine 100. FIG. 1B is a cross-sectional side view of the electrical machine 100 taken along line A-A in FIG. 1. FIG. 2A is a cross-sectional view of another example electrical machine 200. FIG. 2B is a cross-sectional side view of the electrical machine 200 taken along line B-B in FIG. 2A.

The example electrical machine 100 (referred to interchangeably hereinafter as "machines") includes a rotor 40 extending through the interior of a substantially cylindrical stator 30, which resides in a housing 20. The stator 30 includes multiple conductive windings 32 wound upon a laminated ferromagnetic core of the stator 30. The windings 32 extend in an axial direction between the two opposing ends of the stator 30. At both ends of the stator 30, the windings 32 define multiple end turns 34. The rotor 40 includes permanent magnets and is rotatable within the stator 30. An outer diameter of the rotor 40 and an inner diameter of the stator 30 define an air gap 60 between the stator 30 and the rotor 40. The rotor 40 is supported by bearings 45. Some examples of bearings include magnetic bearings, magnetic hybrid bearings, roller bearings, dynamic bearings, journal bearings, thrust bearings, and other types of bearings. The rotor 40 may be supported by any combination of bearings or by bearings of uniform type.

The electrical machine 100 can operate as a motor or a generator. In the generator mode, rotation of the rotor 40 with respect to the stator 30 induces an electromotive force across the windings 32, thereby inducing a voltage across the windings 32, which allows an electric current to flow when a circuit, as part of an external system (unillustrated), is closed across the windings 32. The induced electric current can then be used to output electrical power, for example, to an external system. In the motor mode, an electric current is passed through the stator windings, and the magnetic field produced by the current through the windings 32 interacts with the magnetic fields of the rotor 40 and the stator 30. The interaction can cause rotation of the rotor 40. Rotation of the rotor 40 can deliver mechanical power, for example, via a shaft 172 at the drive end of the machine 100. Rotation of the rotor 40 can also power a fluid compressor, for example, via the shaft 170 at the non-drive end of the machine 100. In some implementations, the electrical machine is operated at speeds including greater than 3,600 rotations per minute.

During operation, either as a motor or as a generator, various components in the electrical machine 100 produce heat energy. For example, the windings 32 are made of a conducting material. Example conducting materials include copper, aluminum, silver, gold, and others. Due to the inherent resistivity of the conducting material, current through the conducting material produces heat during operation. Other components of the electrical machine 100 can also produce heat during operation. For example, friction between moving parts and electrical resistance in other conductive components can also produce heat.

The electrical machine 100 includes a cooling system to cool the various components of the machine 100. The cooling system includes two cooling fluid sources 130a and 130b in fluid communication with multiple cooling fluid conduits 180. Each conduit 180 receives cooling fluid from either the source 130a or the source 130b and communicates the fluid into a region of the machine 100 inside the housing 20. The illustrated fluid source 130 is a motor-driven fan. Within the housing 20, the cooling fluid receives heat energy from one or more components of the machine 100 via conductive heat transfer, while flowing adjacent the one or more components. The cooling fluid then flows out of the housing 20, transporting the transferred heat energy away from the one or more components, thus cooling the machine 100. Cooling fluid from the source 130a is directed to the midstack region of the machine 100, at the axial center of the stator 30. The cooling fluid from the source 130a cools the stator while flowing along the air gap 60 from the axial center of the stator 30 toward both ends of the stator. Cooling fluid from the source 130b is directed onto the exterior of both the drive and the non-drive ends of the machine to cool the end turns 34.

Illustrated in FIG. 1A, a cooling fluid inlet 182a directs cooling fluid from the conduit 180a into a volume about the end turns 34a in the non-drive end of the machine 100, and a cooling fluid inlet 182b directs cooling fluid from the conduit 180b into a volume about the end turns 34b in the drive end of the machine 100. Each of the volumes about the end turns 34a and 34b are defined in the housing 20 by partitions 160 and 162. The partitions 160a and 162a define a volume about the non-drive end of the stator 30, and the partitions 160b and 162b define a volume about the drive end of the stator 30. The partitions 160 and 162 are implemented as bulkheads with multiple ports and openings that allow the extension of components and/or the flow of fluids through the partitions 160 and 162. The illustrated machine 100 is implemented without baffles or shrouds to direct the flow through the volumes about each end of the stator 30. However, in some implementations, such a baffle or shroud can be included. outlets 184a and 184b are configured to collect cooling fluid from the volume about the end turns 34a and 34b, respectively. From both outlets 184a and 184b, the cooling fluid is directed into an exhaust manifold to a common exhaust conduit 230 and exits the machine 100. Cooling fluid flowing along the air gap 60 also enters the volumes about each end turn through the air gap 60, which is radially inside of the interior lateral surface of the stator 30. The cooling fluid from the air gap 60 also exits the machine 100 from the common exhaust conduit 230 (illustrated in FIG. 1B).

The fluid inlets 182 and the fluid outlets 184 both reside radially outside of the interior lateral surface of the stator 30. A pressure differential between the inlet 182a and the outlet 184a can generate a flow of cooling fluid substantially transverse across the exterior of the non-drive end of the stator. For example, a flow of fluid between the inlet 182a and the outlet 184a can function as a cooling flow dedicated to cooling the end turns 34a. Similarly, a flow of fluid between the inlet 182b and the outlet 184b can function as a cooling flow dedicated to cooling the end turns 34b. The inlet 182a and the outlet 184a can displace cooling fluid outside of the stator 30 across an external diameter of the non-drive end of the stator 30, cooling the end turns 34a. Similarly, the inlet 182b and the outlet 184b can displace cooling fluid outside of the stator 30 across an external diameter of the drive end of the stator 30, cooling the end turns 34b.

Illustrated in FIG. 1B, a cooling fluid inlet 182c directs cooling fluid from the conduit 180c into a volume in the midstack of the machine 100, and a cooling fluid inlet 182d directs cooling fluid from the conduit 180d into a volume in the midstack of the machine 100. The inlets 182c and 182d direct cooling fluid from two different azimuthal locations around the stator. Specifically, the inlets 182c and 182d are diametrically opposed across a cross-section near the axial center of the machine 100. A baffle 190 directs the cooling fluid circumferentially around the exterior of the stator 30 from the inlets 182c and 182d. After circulating circumferentially, the cooling fluid flows radially inward through openings or ports in the baffle 190 into an annular manifold 80 formed circumferentially around the outer surface of the stator 30. The stator 30 includes multiple substantially radial openings or vents 70 providing communication between the annular manifold 80 and the air gap 60. The annular manifold 80 is implemented as a midstack gap, which is a gap in the cooling jacket 210 and the stator core at, or in some implementations near, the axial center of the stator 30. The air gap 60 provides communication between the vents 70 and the volume about the first and second ends of the stator 30. For example, fluid may flow axially along the air gap 60, out of the drive end of the stator 30, and through the outlet 184b, and fluid may flow axially along the air gap 60, out of the non-drive end of the stator 30, and through the outlet 184a.

The cooling system of the electrical machine 100 also includes multiple liquid cooling jackets 210, illustrated in FIG. 1A. The liquid cooling jackets 210 extend around an exterior circumference of the stator 30. The cooling jackets 210 are configured to circulate liquid cooling fluid along serpentine flow paths around the stator 30 to cool the stator 30. The serpentine flow of cooling liquid is both circumferential and axial. That is to say that the serpentine flow of cooling fluid, in aggregate, is circumferential and includes axial traverses. Alternatively or in addition, other flow path geometries can also be implemented in the machine 100. The liquid cooling jackets 210 define a plurality of separate circumferential flow paths 212. Each circumferential flow path 212 can circulate liquid cooling fluid around a different axial section of the stator 30 to cool the axial section of the stator 30. The liquid cooling jackets 210 are part of a closed-loop cooling system, wherein liquid cooling fluid is cyclically heated and cooled as the fluid absorbs heat from the stator 30 and transfers heat to a cooling source outside of the housing 20. In some implementations, the liquid cooling jackets 210 are separable from the housing 20 and separable from the stator 30. For example, the liquid cooling jacket 210 can be removed from the electrical machine 100 to be repaired or modified separately from the machine 100.

In one aspect of operation of the machine 100, cooling fluid flows from the source 130a into the conduits 180a and 180b. The fluid flows from the conduits 180a and 180b through the flow inlets 182a and 182b, respectively. From the flow inlets 182a and 182b, the cooling fluid flows across the respective ends of the stator and cools the respective end turns 34. After cooling the end turns 34, the cooling fluid flows through the respective outlets 184a and 184b into an exhaust manifold and out of the housing 20. Cooling fluid also flows from the source 130b into the conduits 180c and 180d. The fluid flows from the conduits 180c and 180d through the flow inlets 182c and 182d, respectively. From the flow inlets 182c and 182d, the cooling fluid flows circumferentially through a region in the housing around the exterior of the axial center of the stator 30. Then the cooling fluid flows substantially radially inward toward the rotor 40, through the manifold 80, through the vents 70, and into the air gap 60. The cooling fluid then flows axially along the gap 60. A portion of the fluid flows toward the drive end of the machine 100, joining the flow of cooling fluid across the end turns 34b and flowing into the exhaust manifold through the outlet 184b. Another portion of the fluid flows toward the non-drive end of the machine 100, joining the flow of cooling fluid across the end turns 34a and flowing into the exhaust manifold through the outlet 184a.

The electrical machine 200, illustrated in FIGS. 2A and 2B includes an alternative embodiment of a cooling system. The machine 200 includes a single cooling fluid source 130 that directs cooling fluid into a manifold 250. The manifold 250 distributes the cooling fluid among various sections of the machine 200. The manifold 250 directs cooling fluid to the midstack of the machine 200 via conduit 180g. The manifold 250 directs cooling fluid to both the drive end and the non-drive end of the machine 200 via conduits 180f and 180e, respectively. The electrical machine 200 includes a liquid cooling jacket 210 that has only two circumferential flow paths 212.

In one aspect of operation of the machine 200, the rotor 40 rotates and drives a compressor component of the source 130. Cooling fluid flows from the source 130 into the manifold 250. The cooling is distributed in the manifold 250 among the conduits 180e, 180f, and 180g. From the conduits, the cooling fluid flows through the respective flow inlets 182e, 182f, and 182g. From the flow inlets 182e and 182f, the cooling fluid flows across the respective ends of the stator and cools the end turns 34. After cooling the end turns 34, the cooling fluid flows through the respective outlets 184 into an exhaust manifold and out of the housing 20. From the flow inlet 182g, the cooling fluid flows circumferentially through a region in the housing around the exterior of the axial center of the stator 30. Then the cooling fluid flows substantially radially inward toward the rotor 40, through the manifold 80, through the vents 70, and into the air gap 60. The cooling fluid then flows axially along the gap 60. A portion of the fluid flows toward each of the drive and non-drive ends of the machine 200, joining the flow of cooling fluid across the end turns 34 and flowing into the exhaust manifold through the outlets 184.

The illustrated electrical machines 100 and 200 are example embodiments. Therefore, some implementations of an electrical machine will include additional and/or different features with respect to the illustrated examples, and some implementations of an electrical machine will omit features of the illustrated examples.

In FIG. 1A, the conductive windings 32 are incorporated into the stator 30. However, in some implementations, the windings 32 are included in the rotor 40 rather than the stator 30. In FIG. 1A, the shafts 170 and 172 are integrally formed to the rotor 40. However, the shafts 170 and 172 may be separate elements directly or indirectly attached to the rotor 40 and not integral to the rotor 40. In FIG. 1A, partitions 160 and 162 define a volume about each end of the stator 30. However, the machine 100 may be implemented without one or more of the partitions 160 and 162. In some implementations, the volume about each end of the stator 30 is defined by the housing 20 and/or other features of the machine. In some implementations, the volumes about the ends of the stator 30 are not defined by structure, but rather, by an air curtain, by a pressure differential across the interior of the housing, or by the relative orientation of the inlet 182 and the outlet 184.

In FIG. 1A, the inlets 182 are axially located at each end of the stator 30, directing fluid substantially perpendicular to a primary longitudinal axis defined by the rotor 40. In some implementations, the inlets 182 are axially positioned radially outside of the interior lateral surface of the stator and beyond the ends of the stator 30 That is to say that, in some implementations, a flow inlet or a flow inlet is located radially outside of the stator and offset axially beyond an end of the stator. For example, the inlet 182b may be located beyond the drive end of the stator 30 and radially outside of the interior lateral surface of the stator. In some implementations, the inlets 182 direct fluid at an angle with respect to the primary longitudinal axis defined by the rotor 40. For example, the inlet 182b may direct fluid at an angle toward or away from the axial center of the stator 30. In FIG. 1A, both inlets 182a and 182b are at the same azimuthal angle. That is to say that both inlets 182a and 182b direct fluid at the same radial orientation across the stator (i.e., from the top of the page). However, in some implementations, one or both of the inlets 182a, 182b are offset at a different azimuthal angle. For example, in some implementations, the inlets 182a and 182b may direct flow into the page, out of the page, or from the bottom of the page.

In FIG. 1B, two flow inlets 182c and 182d are diametrically opposed at the axial center of the stator 30. However, in some implementations, one inlet 182 or more than two inlets 182 (e.g., three, four, five, or more) may be used to direct flow into the air gap 60. Moreover, the inlets 182 may be at any azimuthal orientation or set of azimuthal orientations around the stator 30, and the inlets 182 may be at any axial position with respect to the stator 30. For example, the inlets 182 directing flow into the air gap 60 may be distributed between the partitions 162 at four different azimuthal orientations.

The manifold 250 illustrated in FIGS. 2A and 2B, or a similar structure, may also be used to distribute fluid in the system 100. For example, the sources 130a and 130b may be in fluid communication with a manifold that defines conduits that function similarly to the conduits 180a, 180b, 180c, and 180d. Moreover, the system 200 may be implemented without the manifold 250. For example, each of the conduits 180e, 180f, and 180g may be defined by separate pipes or conduits independent of the manifold 250.

In the illustrated implementations, the cooling sources 130 are motor-driven fans. However, the cooling sources may be any fluid flow generator to provide a pressurized source of cooling fluid. In some implementations, the cooling sources 130 are compressors powered by rotation of the shaft 170. Examples of cooling fluid include air, hydrogen, vapor, nitrogen, methane, and any combination of these and/or other fluids. In some cases, the cooling fluid is circulated for reasons other than to cool one or more aspects of the machine. For example, in some cases, the cooling fluid may be used to heat one or more components of the machine. Example fluid flow generators include impellers, fans, blowers, and others. A fluid flow generator may include a centrifugal compressor, or any other type of compressor, uncoupled from the shaft 170 and powered independently by an external system. Furthermore, the fluid flow may cool various components and/or parts of the electrical machine not explicitly named herein. For example, the cooling fluid may cool various components of the rotor 40, the stator 30, the bearings 45, the housing 20, and other components not explicitly named.

In some implementations, the flow of cooling fluid is reversed. For example, cooling fluid can flow into the volumes about the ends of the stator from the exhaust manifold through the outlets 184. In this example, the cooling fluid flows from the volume about the ends of the stator through the inlets 182 into the conduits 180a, 180b and through the air gap 60 toward the conduits 180c, 180d. In some implementations, additional cooling fluid guides may be added to direct or divert fluid. For example, in the system 200, a baffle 190 directs fluid toward the sides of the stator 30.

The liquid cooling jackets 210 are illustrated with four circumferential flow paths 212, but one or more liquid cooling jacket 210 can be implemented with any number of circumferential flow paths 212. For example the liquid cooling jackets 210 may include fewer or greater than four flow paths 212. The liquid cooling jackets 210 can be implemented as an open- or closed-loop cooling system. The liquid cooling jackets 210 can circulate liquid cooling fluids such as water, nitrogen, and/or others.

In certain applications, the cooling system may be altered to provide improved and/or optimal flow and/or cooling efficiency. Features may be added in a centrifugal compressor intake, for example, such as inlet guides or baffles, which may be manually or automatically adjustable, or replaceable. Features may also be added in some embodiments to adjust the flow path of the output of the centrifugal impeller, including adjustable baffles, or throttle valves. In some embodiments, the inlet air temperature, composition, e.g., mixture of gases, or inlet pressure may be adjusted to adjust the gas flow and/or heat transfer characteristics.

In some embodiments, sensors may sense temperature information, such as, for example, using RTDs (resistance temperature detectors), thermocouples, or optical sensing devices, and monitored at various locations, such as, for example, at the rotor, stator, or the inlet and outlet to determine an inlet-outlet differential, for input to a controller, such as a PLC (programmable logic controller) or embedded processor device. The controller may provide status indication or information, communicate with other devices, for example, over a network, such as a LAN or the Internet, or issue control commands to control adjustment mechanisms, such as those capable of adjusting the flow as described above. The controller may be part of a feedback control system used to regulate one or more parameters, such as, for example, monitored temperatures.

Figure 3:
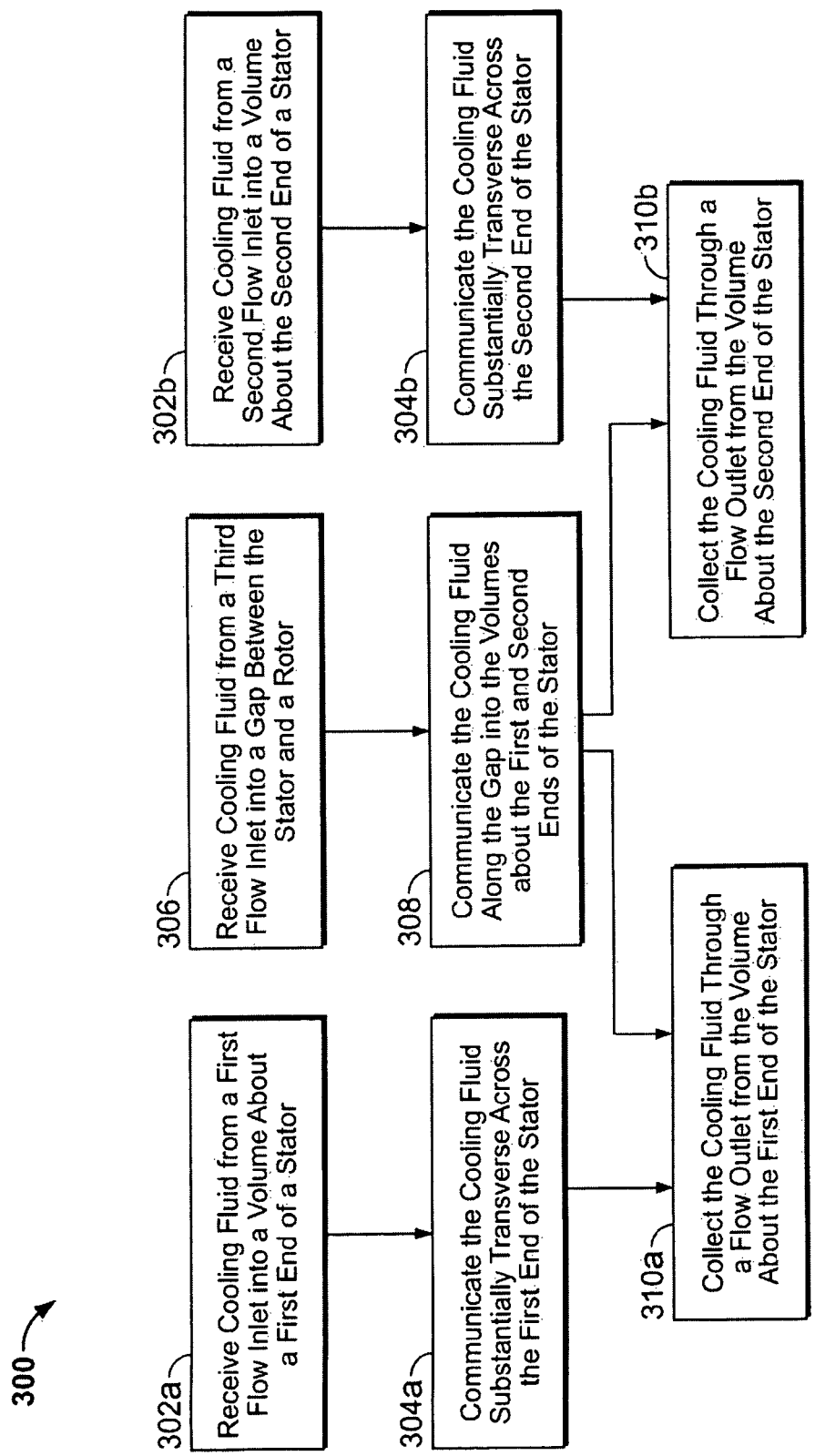
FIG. 3 is a flow chart illustrating an example process for cooling an electric machine.

FIG. 3 is a flow chart illustrating an example process 300 for cooling an electrical machine. The process 300 can be used to cool either of the example machines 100 and 200, as illustrated in FIGS. 1 and 2. More generally, the process 300 can be used to cool an electrical machine before, during, or after a generating, motoring, or other mode of operation. In some implementations, the process 300 includes more, fewer, or different operations in the same or a different order.

At 302a, cooling fluid is received from a first flow inlet into a corresponding volume about a first end of a stator. At 302b, cooling fluid is received from a second flow inlet into a corresponding volume about a second end of the stator. The first flow inlet and/or the second flow inlet is located radially outside of the interior surface of the stator. The first and second flow inlets may be in fluid communication with the same cooling fluid source or two different cooling fluid sources.

At 304a, cooling fluid is communicated substantially transverse across the first end of the stator. At 304b, cooling fluid is communicated substantially transverse across the second end of the stator. At the first end of the stator and/or at the second end of the stator, the substantially transverse flow traverses an external transverse dimension of the stator without entering the stator. For example, the substantially transverse flow may flow across the stator from the top of the stator to the bottom of the stator, or the substantially transverse flow may flow across the stator from the left of the stator to the right of the stator, or at any other angle. A substantially transverse flow of cooling fluid may be a substantially non-axial flow, impinging an axial cross-section of the stator substantially parallel to the diameter of the cross-section. In some implementations, the substantially transverse flow has an axial flow component. As the substantially transverse flow impinges the exterior perimeter of the stator and/or the exterior perimeter of the rotor, the flow is directed around the circumference of the stator and/or the rotor, cooling the stator and/or the rotor. The substantially transverse flow may function as a cooling mechanism to cool the end turns. In some implementations, the cooling fluid is simultaneously communicated substantially transverse across both the first and second ends of the stator. In other implementations, only the drive end or the non-drive end of the stator is cooled by a substantially transverse flow.

At 306, cooling fluid is received from a third flow inlet into an air gap between the stator and the rotor. The third flow inlet may be in fluid communication with the same or a different source of cooling fluid as the first and/or second flow inlets. In some implementations, the third flow inlet includes multiple flow inlets distributed around the axial center of the stator at different azimuthal locations. The cooling fluid from the third flow inlet is communicated from into the air gap through a manifold axially dividing a core of the stator.

At 308, cooling fluid is communicated axially along the air gap into the volume about the first end and/or the second end of the stator. In some implementations, the cooling fluid is simultaneously communicated along the air gap in both axial directions on either side of the third flow inlet. For example, if the third flow inlet is located near the axial center of the stator, the cooling fluid may simultaneously flow along the air gap toward the drive end and toward the non-drive end of the electrical machine from the center of the stator. In such a case, the cooling fluid is communicated into the volume about the first end of the stator and the volume about the second end of the stator. In other cases, cooling fluid is communicated axially along the air gap to only one end of the stator, for example, the drive end or the non-drive end of the stator.

At 310*a*, cooling fluid is collected through a first flow outlet from the volume about the first end of the stator. At 310*b*, cooling fluid is collected through a second flow outlet from the volume about the second end of the stator. The first flow outlet and/or second flow outlet is located radially outside of the interior surface of the stator. In some implementations, the cooling fluid collected through the first flow outlet includes cooling fluid from the first and third flow inlets. In some implementations, the cooling fluid collected through the second flow outlet includes cooling fluid from the second and third flow inlets. From the first and second flow outlets, the cooling fluid is communicated out of the machine through one or more exhaust manifolds.

In some implementations, the first flow outlet and the first flow inlet are cooperatively arranged to communicate the flow substantially transverse across the first end of the stator, and/or the second flow outlet and the second flow inlet are cooperatively arranged to communicate the flow substantially transverse across the second end of the stator. In some implementations, the first flow outlet and the first flow inlet are arranged to displace cooling fluid across an outer diameter of the first end of the stator while the fluid is in the volume external to the stator about the end turns, and/or the second flow outlet and the second flow inlet are arranged to displace cooling fluid across an outer diameter of the second end of the stator while the fluid is in the volume external to the stator about the end turns.

A number of implementations have been described. Nevertheless, it will be understood that various modifications may be made. Accordingly, other implementations are within the scope of the following claims.

What is claimed is:

1. An electrical machine comprising:
   a stator disposed in a housing of the electrical machine and comprising windings having a first plurality of end turns at a first end of the stator and a second plurality of end turns at a second, opposing end of the stator, the stator having a substantially tubular shape and an interior lateral surface;
   a rotor extending through an interior of the stator;
   a partition defining a volume in the housing about the first end turns;
   a flow inlet into the volume about the first end turns, the flow inlet located radially outside of the interior lateral surface; and
   a flow outlet from the volume about the first end turns, the flow outlet comprising a port through the partition located radially outside of the interior lateral surface, the inlet and the outlet cooperatively arranged to communicate a flow of fluid from a first point on a radial exterior of the first end turns substantially transverse across the first end of the stator to the flow outlet.

2. The electrical machine of claim 1, the flow outlet comprising a first flow outlet, the flow inlet comprising a first flow inlet, the volume comprising a first volume, the flow comprising a first flow, the partition comprising a first partition, the port comprising a first port, the electrical machine further comprising:
   a second partition defining a second volume in the housing about the second end turns;
   a second flow inlet into the second volume about the second end turns, the second flow inlet located radially outside of the interior lateral surface; and
   a second flow outlet from the second volume about the second end turns, the second flow outlet comprising a second port through the second partition located radially outside of the interior lateral surface, the second inlet and the second outlet cooperatively arranged to communicate a second flow from a second point on a radial exterior of the second end turns substantially transverse across the second end of the stator to the second flow outlet.

3. The electrical machine of claim 2, the first flow inlet and the second flow inlet in fluid communication with a single source of cooling fluid.

4. The electrical machine of claim 1, the flow inlet comprising a first flow inlet, the electrical machine further comprising a second flow inlet operable to direct a second flow through a manifold axially dividing a core of the stator to an air gap defined between the interior lateral surface of the stator and an exterior lateral surface of the rotor.

5. The electrical machine of claim 4, the second flow inlet comprising a plurality of flow inlets at different azimuthal locations around the stator.

6. The electrical machine of claim 4, the first flow inlet and the second flow inlet in fluid communication with a single source of cooling fluid.

7. The electrical machine of claim 4, the first flow inlet in fluid communication with a first cooling source, the second flow inlet in fluid communication with a second cooling source.

8. The electrical machine of claim 4, the second flow inlet operable to direct flow to an axial center of the air gap, the air gap extending in an axial direction to the volume about the first end turns.

9. The electrical machine of claim 1, further comprising at least one cooling jacket around an exterior of the stator, the at least one cooling jacket configured to circulate liquid cooling fluid circumferentially around the stator to cool the stator.

10. The electrical machine of claim 9, the at least one liquid cooling jacket defining a plurality of serpentine flow paths, each serpentine flow path to circulate the liquid cooling fluid around a different axial section of the stator to cool the axial section of the stator.

11. The electrical machine of claim 9, the at least one liquid cooling jacket separable from the housing and separable from the stator.

12. An electrical machine comprising:

a substantially cylindrical stator disposed in a housing of the electrical machine and comprising windings having a first plurality of end turns at a first end of the stator and second plurality of end turns at a second, opposing end of the stator, the stator having a substantially tubular shape and an interior lateral surface;

a rotor extending longitudinally through an interior of the stator;

a plurality of first inlets at multiple locations distributed azimuthally around an exterior of the stator operable to direct flow through a midstack gap axially dividing a core of the stator to an air gap defined between the interior lateral surface of the stator and the rotor, the air gap extending through the interior of the stator from a first volume in the housing external to the stator about the first end turns to a second volume in the housing external to the stator about the second end turns, a first portion of the air gap operable to direct a first cooling flow along the interior lateral surface from the midstack gap, the first volume about the first end turns operable to receive the first cooling flow from the air gap;

a second inlet into the first volume; and a first outlet from the first volume, the second inlet and the first outlet cooperatively arranged to displace cooling fluid across an outer diameter of the first end of the stator while the fluid is in the first volume.

13. The electrical machine of claim 12, further comprising:

a third inlet into the second volume; and a second outlet from the second volume, the third inlet and the second outlet cooperatively arranged to displace cooling fluid across an outer diameter of the second end of the stator while the fluid is in the second volume.

14. The electrical machine of claim 12, wherein a second portion of the air gap directs a second cooling flow along the interior lateral surface from the midstack gap, the second volume about the second end turns operable to receive the second cooling flow from the air gap.

15. The electrical machine of claim 2, wherein the rotor and the interior lateral surface of the stator define an air gap that extends from the first volume about the first end turns to the second volume about the second end turns, and the air gap is arranged to receive an additional flow of fluid at a midstack of the stator and to communicate the additional flow of fluid into the first volume and into the second volume.

* * * * *